8909X
J. Goulding.
Welding Boiler Pipes.
Patented Jun. 19, 1835.
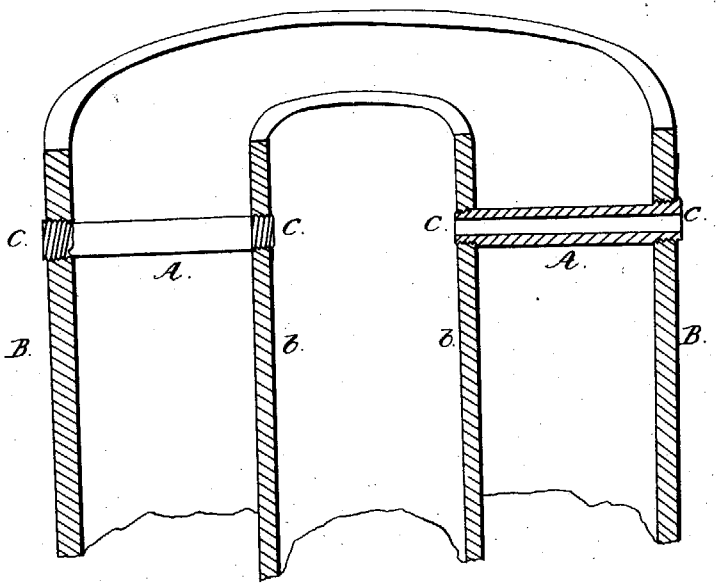
N. PETERS, PHOTO-LITHOGRAPHER, WASHINGTON, D. C.

8909 X June 19. 1835

John Goulding of Boston Massachusetts
Letters Patent

The Schedule referred to in these Letters Patent and making pa
of the same [illegible] the said John
Goulding himself of his improvement in the mode of preparing
and screwing in the pipes into Boilers where the same are use
for the transmission of water or heated air from one part of the boi
to another To all to whom these presents shall come Whereas I John Goulding of Boston in the County of Suffolk and
Commonwealth of Mafsachusetts, Machinist did on the twenty
fifth day of October in the year of our Lord one thousand Eight h
dred and thirty four obtain Letters Patent of the United States for a ne
and useful improvement in the mode of making Boilers for gene
ting Steam and evaporating water and other fluids which impro
ment consisted in the arrangement and combination of two inter
nal cylinders with connecting pipes between them all being en
sed within an outer case or cylinder as is in the specification of
improvement now on file in the Patent Office at Washington particula
set forth. Now know ye that I the said John Goulding on
the date aforesaid have discovered and applied to use a new an
useful mode of preparing and serewing in the pipes into any su
Boiler or into any Boiler where the same are used for the transmis
of water or heated air from one part of the Boiler to another and
that the following is a full and exact description of the mode of
preparing and screwing in the pipes as invented by me. In the
herete annexed A represents a tube. B.b. represent two cylinders
the sides of two cases or chambers, which cylinders cases or chamber
are connected by the tube A so that water or heated air may be co
veyed thro' the tube from one to the other. C. is one end of the tube
A upon which a ring is welded or it is upset so as to be larger
the inside of the tube. The outer side or circumference of this larg
end is made tapering and a small screw is cut upon the tapering

[illegible]

[illegible] 8909X part C. is the other end of the tube which is also made tapering so as to be a little smaller than the residue of the tube. A male screw is also cut upon this end. The threads of these screws are all exactly equidistant. The diameter of the hole of the tube may be uniform. Apertures are made in the cylinders or sides B.b. They are tapering and a female screw is cut in them so as exactly to conform in size and shape, to the size and shape of the tapering ends of the tube. The aperture in the cylinder or side B being larger than the aperture in the cylinder or side b. the tube is inserted on thro' the aperture in B. which is large enough to admit its passing on until the small end C. reaches the aperture in b. when both ends are screwed home together. The length of the tapering part of the ends of the tube and of the screw cut upon them will depend upon the thickness of the cylinders or the sides of the cases or chambers.

I claim Letters Patent for the mode of preparing and screwing in pipes into a boiler where the same are used for the transmission of water or heated air from one part of the boiler to another as above described.

Exd. Witnesses
W.P.E. Edmund G. Loring
Horace Mann

John Goulding (637 Words)

[Patented June 19th 1835]

710 [illegible]